No. 654,215. Patented July 24, 1900.
C. A. WORDEN, Dec'd.
M. L. WORDEN, Administratrix.
SHARPENING MACHINE.
(Application filed Dec. 18, 1899.)
(No Model.) 4 Sheets—Sheet 1.
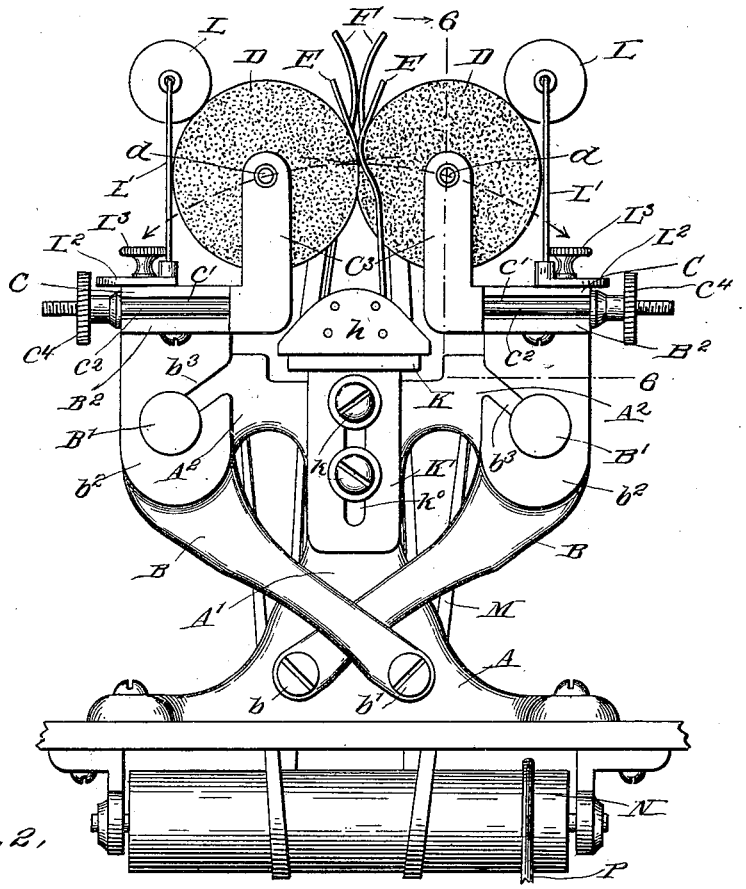
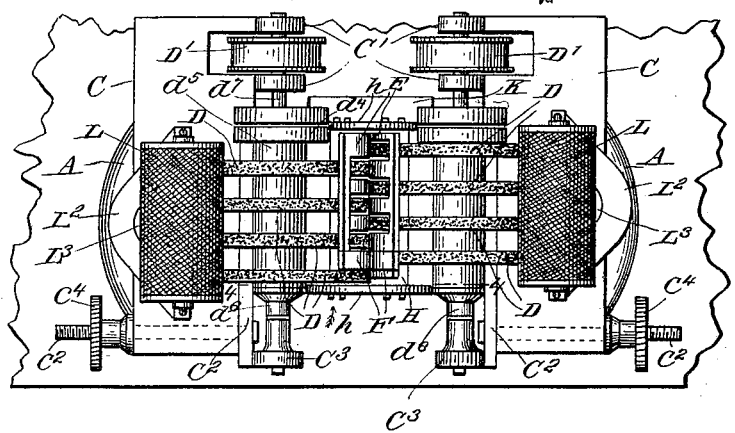
Witnesses: Inventor:

No. 654,215. Patented July 24, 1900.
C. A. WORDEN, Dec'd.
M. L. WORDEN, Administratrix.
SHARPENING MACHINE.
(Application filed Dec. 18, 1899.)
(No Model.) 4 Sheets—Sheet 2.
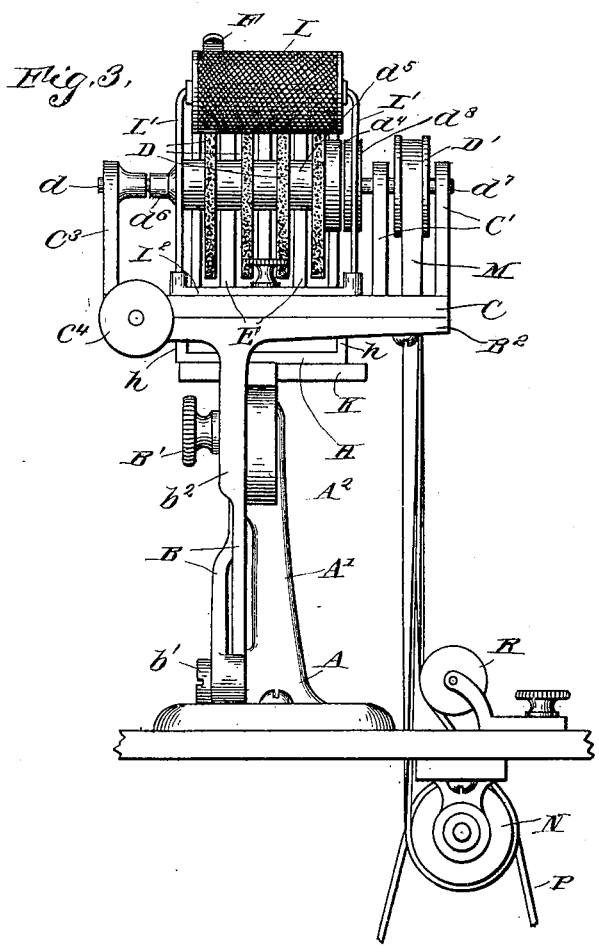
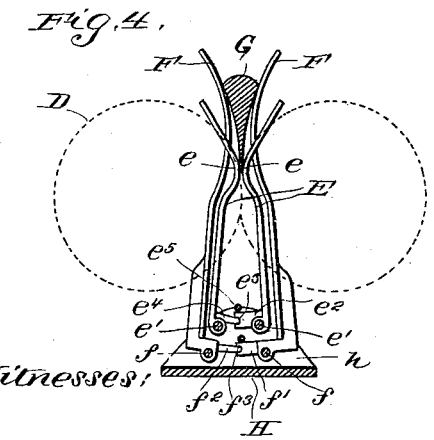
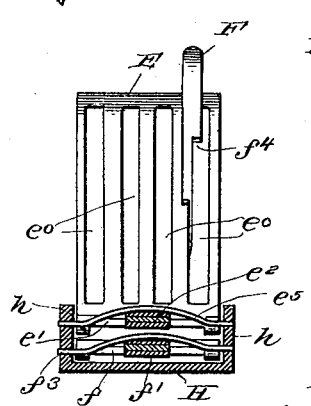

No. 654,215. Patented July 24, 1900.
C. A. WORDEN, Dec'd.
M. L. WORDEN, Administratrix.
SHARPENING MACHINE.
(Application filed Dec. 18, 1899.)
(No Model.) 4 Sheets—Sheet 3.
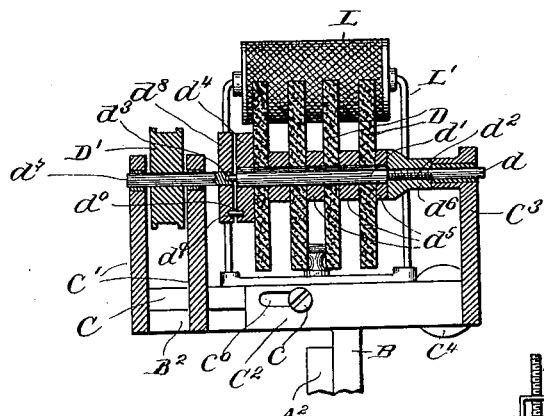
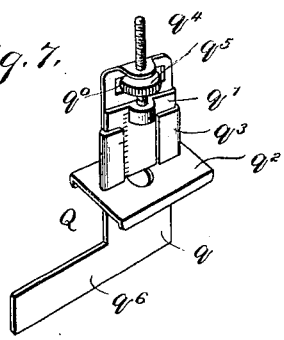
Witnesses:
Margaret Bower
Frank H. Chamberlin
Inventor:
Mary L. Worden, Administratrix
of the Estate of Charles A. Worden
deceased
By Walter H. Chamberlin
Atty.
THE NORRIS PETERS CO., PHOTO-LITHO., WASHINGTON, D. C.

No. 654,215. Patented July 24, 1900.
C. A. WORDEN, Dec'd.
M. L. WORDEN, Administratrix.
SHARPENING MACHINE.
(Application filed Dec. 18, 1899.)
(No Model.) 4 Sheets—Sheet 4.
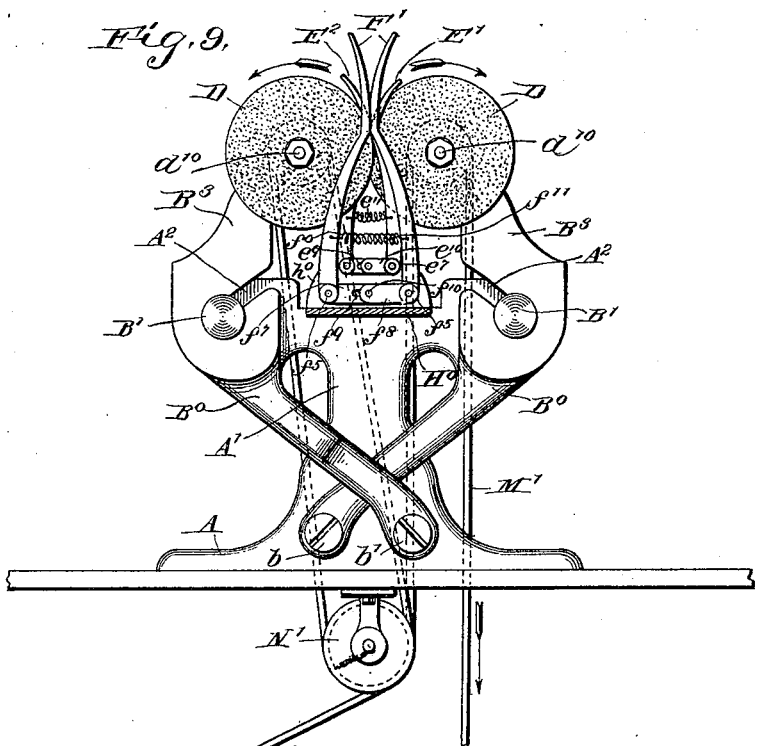
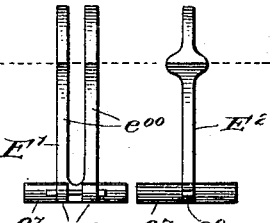
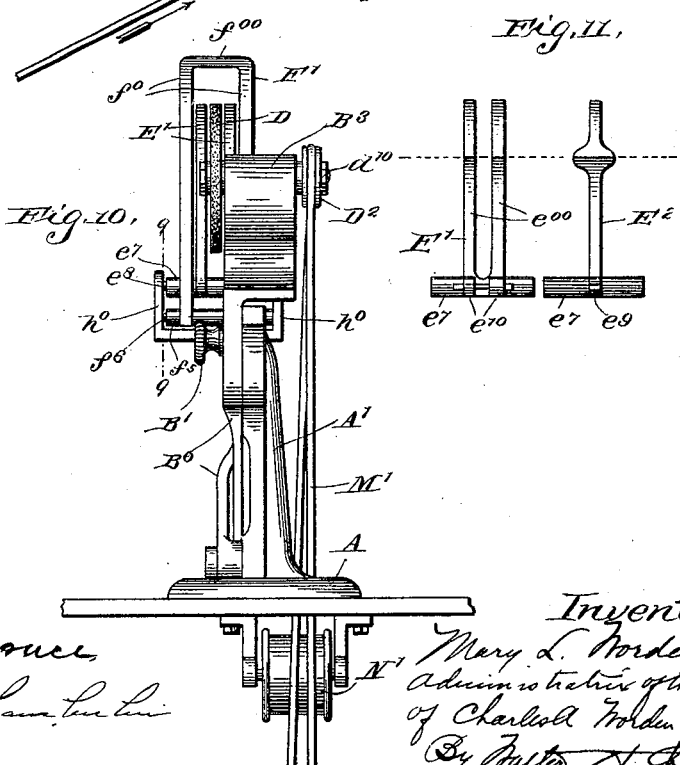

UNITED STATES PATENT OFFICE.

MARY L. WORDEN, OF DENVER, COLORADO, ADMINISTRATRIX OF CHARLES A. WORDEN, DECEASED.

SHARPENING-MACHINE.

SPECIFICATION forming part of Letters Patent No. 654,215, dated July 24, 1900.

Application filed December 18, 1899. Serial No. 740,841. (No model.)

*To all whom it may concern:*

Be it known that CHARLES A. WORDEN, deceased, late a citizen of the United States, residing at Denver, county of Arapahoe, State of Colorado, did invent a certain new and useful Improvement in Sharpening-Machines; and the following is declared to be a full, clear, and exact description of the invention, such as will enable others skilled in the art to which it pertains to make and use the same, reference being had to the accompanying drawings, which form a part of this specification.

The invention relates to improvements in machines for grinding razors, surgical instruments, knives, and other cutlery, and embodies the novel features and combination of parts hereinafter described and claimed.

To more fully describe said invention, reference is had to the accompanying drawings, in which like parts are indicated by like letters throughout the several views.

Figure 1 represents the improved grinding-machine in front elevation. Fig. 2 represents the machine in plan view with the driving-belts omitted. Fig. 3 represents the machine in end elevation with the driving mechanism attached. Fig. 4 is a detail sectional view of the device for holding the instrument in position, taken along the line 4 4 in Fig. 2 and looking in the direction of the arrow. Fig. 5 is a central longitudinal section of the said holding device. Fig. 6 represents a section taken along the line 6 6 in Fig. 1 and looking in the direction of the arrow. Fig. 7 is a perspective view of the gage for setting the machine for different angles of the cutting edges. Fig. 8 represents the same in position on the holding device. Fig. 9 represents a modified form of the grinding-machine in front elevation and partly in section. Fig. 10 represents the same in side elevation; and Fig. 11 is a detail view of the smaller holding-jaws, showing them placed beside each other.

The invention embodies, essentially, a machine for grinding a razor or other cutting instrument by the action of two or more grinding-wheels, one or more of such wheels operating on each side of the cutting edge of the instrument.

In the accompanying drawings, A represents the base of the machine, having the upright portion A' and the arms $A^2$, formed integral therewith. Pivoted to the base, as at $b$ and $b'$, are the arms B, each having the vertically-extending portions $b^2$, which are slotted, as at $b^3$. These arms cross each other near the pivotal points and are held in the desired angular position by the thumb-screws B', which pass through the slots and screw into the arms $A^2$. At the upper end of each of the arms B and formed integral therewith are the plates or supports $B^2$, extending to each side of the said arms, and mounted upon these are the plates C, having the uprights C' integral therewith. The narrow plates $C^2$, carrying the uprights $C^3$, are secured to the inner sides of the plates C and $B^2$ by the screw $c$, which passes through the slot $c^0$. The plates $C^2$ are further held in position by the screw-threaded rods $c^2$, rigidly attached thereto. The rods $c^2$ pass through the slots $c'$ in the end of the plate $B^2$ and carry upon their screw-threaded ends the thumb-nuts $c^4$. By this arrangement the plates $C^2$, and hence the uprights $C^3$, may be removed or adjusted at pleasure, the object of which will be hereinafter explained.

D represents the grinding-wheels, which may be of any suitable substance for the purpose of grinding. These wheels are arranged in two sets, one set being mounted on each side of the vertical plane which would pass transversely through the center of the machine. The grinding-wheels are mounted on the shafts $d$. These shafts $d$ are enlarged, as at $d'$, where they engage the grinding-wheel, are screw-threaded, as at $d^2$, and reduced in diameter, as at $d^3$. At one end of the enlarged portion $d'$ of the shafts are rigidly secured the collars $d^4$. One of the end grinding-wheels of each set engages the collars $d^4$, and separating the other grinding-wheels on the shaft are the collars $d^5$. The grinding-wheels are then held securely in position by the nuts $d^6$, which engage the screw-threaded portion $d^2$ of the shafts. The reduced portion $d^3$ of the shaft $d$ engages the hollow end of the shaft $d^7$, which latter is journaled in the uprights C'. A collar or face-plate $d^8$, similar to the collar or face-plate $d^4$, is mounted on one end of the shaft $d^7$ and is provided with a pin $d^9$, which pin engages a hole $d^0$ in the collar $d^4$. Thus it will be seen that by revolving the shaft $d^7$ its motion will be transmitted through the connecting-pin $d^9$ to the shaft $d$, which will cause the grinding-wheels mounted thereon also to revolve.

The shafts $d^7$ are rotated by means of the pulleys D', mounted rigidly thereon between the uprights C'. This method of mounting the grinding-wheels allows them to be readily removed and admits of others of different sizes and degrees of coarseness or fineness to be substituted for the ones removed. It is simple, strong, and effective, allowing the grinding-wheels to be entirely independent of each other. The grinding-wheels thus mounted are so arranged that one set occupies a position opposite the space separating the individual wheels of the other set, so that when the wheels are brought close together, as will be hereinafter shown, the wheels may pass between each other without touching.

The razor or other cutting instrument to be sharpened is held between two sets of jaws E and F. (See Fig. 4.) The jaws E consist of two upright metal pieces curved as at $e$ and there adapted to engage the blade of the instrument to be ground. The metal pieces of the jaws E are each provided with the apertures $e^0$, through which the grinding-wheels pass when brought close together, the said jaws are pivotally mounted on the rods $e'$, which are journaled in the ends $h$ of the plate H. One of the jaws E is provided with a lug $e^2$, having at one end the slot or groove $e^3$, and engaging this slot or groove is a lug $e^4$, carried by the other jaw E, so that when angular displacement is imparted to one jaw the other is moved to the same extent. A spring-wire $e^5$, secured in the ends of the plate H and passing over the lug $e^2$, tends to keep the portion $e$ of the jaws together, and hence to hold the cutting-blade, or a spring arranged in any other way may be used to keep the jaws pressed together. The other jaws F, which engage and hold the upper portion or back of the cutting instrument, are much narrower than the jaws E and are intended to hold the blade in a vertical plane. These jaws are pivotally mounted on the rods $f$ and are provided with the lugs $f'$ and $f^2$ and with the spring-wire $f^3$, which tends to hold them together, all similar to the corresponding parts on the jaws E. The jaws F pass through one of the apertures of the jaws E and are reduced in breadth, as at $f^4$, to prevent the grinding-wheel from engaging them. This plate H, carrying the holding device, is mounted upon the supporting-plate K, which is provided with the downwardly-extending portion K'. This portion K' is provided with a slot $k^0$, through which passes the set-screw $k$, securing the portion K' to the upright A in such a way that the jaws E and F may be raised or lowered by raising or lowering the supporting-piece K'. Oil or water may be supplied to the grinding-wheels from the rollers L, covered with cloth or any other suitable material. These rollers are carried by the upright supports L', which are secured at their lower ends to the plates $L^2$, which latter are held in position by the thumb-screws $L^3$. Such an arrangement admits of the rollers L being easily and quickly removed. The grinding-machine thus constituted may be driven by the pulleys D' from any convenient source of power or by means of any arrangement of suitable gearing. The pulleys D' are shown driven by the belts M, which pass over a roller N, mounted beneath the machine and driven by belts P, the slack of the belt M being taken up by the idler R; but obviously the invention is not confined to this method of driving the machine.

The razor or other cutting instrument to be ground is placed between the jaws, as shown at G, Fig. 4, and moved back and forth between the revolving wheels in a vertical plane, thus insuring perfect uniformity in the grinding and perfect symmetry of the sides of the cutting edge. The holding device permits any shape of blade to be moved back and forth freely and is stiff enough to prevent any movement outside of a vertical plane.

By introducing a gage Q in a vertical direction between the jaws of the holding device and adjusting it to different depths the angle of cutting edge to be ground can be varied at pleasure. This gage (shown in Figs. 7 and 8) consists of a right-angled metal piece $q$, with one member $q'$ passing through a flanged plate $q^2$ and held by the upright portion $q^3$, which is bent to inclose the member $q'$. To the upper end of the member $q'$ is secured a screw $q^4$, which engages a milled nut $q^5$, which is adapted to engage a slot $q^0$ in the upright $q^3$, so that by placing the gage in position, as shown in Fig. 8, and turning the nut $q^5$ the portion $q^6$ of the gage may be inserted between or withdrawn from the jaws. The gage is provided with marks on the inside moving member corresponding to certain angles and a mark on the outside stationary member. By turning the milled nut to make coincidence between the moving and stationary marks any angle can be set. The gage is then put in the jaws and the grinding-wheels brought against the corner edge and fastened by the screws $b'$.

By the arrangement of pivoting the arms B, which carry the grinding-wheels, the wear of the wheels can be taken up, and the point of intersection of the perimeters of the wheels can be always brought exactly in the vertical plane determined by putting the gage in the blade-holder, loosening the screws B', then bringing the wheels against the lower edge of the gage, and then tightening the screws B' again. As the arc through which the grinding-wheels are moved when resetting them after they have become worn approaches very near a straight line, it is not sufficient to materially affect the efficiency of the edge, since the cutting edges of knives of various sorts, razors, and surgical instruments vary from fifteen degrees to twenty degrees.

The difficulty in getting a perfectly-true bevel on an edge lies in the fact that by ordinary methods it is difficult to hold such edge true and immovable in a lateral direction while being ground. This device permits a free movement in a vertical plane, but none laterally. Thus it follows that by this device a curve of any sort can be ground to a true bevel on both sides.

Obviously the machine described above is capable of many modifications which may be used without departing from the spirit of the invention. For example, the number of grinding-wheels may be reduced. Instead of having a plurality of wheels on each shaft or on each side of the blade to be ground there may be employed, and in many cases will be found advantageous to employ, only two grinding-wheels, one on each side of the blade. Again, the employment of only two grinding-wheels renders possible a much simpler construction as regard the means for supporting the grinding-wheels, and the holding-jaws are also capable of being modified in many different ways.

The modifications above referred to, as well as others, are embodied in the machine. (Shown most clearly in Figs. 9, 10, and 11.) The arms $B^0$ instead of carrying detachable supports for the wheels have the supports $B^3$, in which the shafts carrying the grinding-wheels are journaled, made integral with them. The shafts for the grinding-wheels are journaled in these supports, as shown, the grinding-wheels being mounted at one end of the shafts and the pulleys $D^2$ at the other end. The angular adjustment of the grinding-wheels is effected in the same manner as before described—that is, by moving the arms $B^0$ about their pivotal points $b$ and $b'$. The support or plate carrying the jaws consists in this case of a plate $H^0$, cast integral with the upright portion $A'$ and provided with the upwardly-projecting ends $h^0$. Between these ends $h^0$ are mounted the holding-jaws $F'$, $E'$, and $E^2$. The jaws $F'$ consist of two members $f^0$, joined at their upper ends, as at $f^{00}$. At the lower ends of the jaws $F'$ are the short hollow shafts $f^5$, which being supported on the rods $f^6$ afford a means for pivoting the said jaws. In order that both jaws of the set $F'$ may be brought together or separated equally, they are provided at their lower ends with the lugs $f^7$ and $f^8$. The lug $f^7$ is slotted at $f^9$ and is adapted to pass into the end of the lug $f^8$ and engage a pin $f^{10}$, which passes through the lug $f^8$ and through the slot $f^9$ of the lug $f^7$, the levers in this respect being the same construction as the levers $E'$ $E^2$, Fig. 11, so that if one of the jaws $F'$ is revolved to any extent around its pivotal support the jaw opposite will move to the same extent. One of the ends $h^0$ of the plate $H^0$ is removed, as shown in section, Fig. 9, to more clearly show the method of pivoting the jaws. The section is taken along the line 9 9 of Fig. 10. These jaws are provided with the spiral spring $f'''$, which tends to keep their upper ends together. The function of the jaws $F'$ is the same as that of the jaws $F$ of the other machine—that is, they hold the back of the razor or other blade, while the jaws $E'$ and $E^2$ engage the blade at or near its edge. The members $f^0$ of the jaws $F'$ support the blade on each side of the grinding-wheels. The jaws $E'$ and $E^2$ are mounted between the ends $h^0$ of the plate $H^0$. The jaw $E'$ is provided with two members $e^{00}$, separated at their upper ends, so that one of the grinding-wheels will normally rest between the members. The jaw $E^2$ consists of a single upright member adapted to occupy a position directly opposite the jaw $E'$ and on one side of one of the grinding-wheels. Both jaws $E'$ and $E^2$ are provided with the short hollow shafts $e^7$, mounted upon rods $e^8$, and have the lugs $e^9$ and $e^{10}$ engaging each other, all as and for the purpose described with reference to similar parts on the jaws $F'$. The upper ends of the jaws $E'$ and $E^2$ are held together by the spiral spring $E^{11}$. The arrangement of the belting may also be changed, as was before observed. For instance, as shown in Figs. 9 and 10, there may be employed a small round belt, made to pass first to the pulley $N'$, then over one of the grinding-wheel pulleys, then back to the pulley $N'$ again, and then up over the other grinding-wheel pulley and back to the driving pulley or wheel. There are obviously many other methods of driving that may be employed, if desired. It is, moreover, obvious that said machine is capable of many other modifications without departing from the spirit of the invention; but

What is claimed, and desired to be secured by Letters Patent of the United States, is—

1. In a sharpening-machine, the combination with grinding-wheels and adjustable supports therefor; of a blade-holding device consisting of two sets of spring-actuated pivoted jaws mounted between the said adjustable supports, and adapted to hold the blade in an upright position, substantially as described.

2. In a sharpening-machine the combination with grinding-wheels and adjustable supports for the same; of a blade-holding device consisting of a pair of spring-actuated flat metal jaws; and a pair of pivoted jaws mounted near the first pair of jaws, substantially as described.

3. In a sharpening-machine, the combination with grinding-wheels and adjustable supports for the same; of a blade-holding device consisting of a pair of flat metal pivoted jaws one of said jaws having an aperture to receive one of said grinding-wheels and a pair of pivoted jaws mounted near the first pair of jaws, substantially as described.

4. In a sharpening-machine, the combination with grinding-wheels and adjustable supports therefor; of a blade-holding device consisting of a pair of upright pivoted jaws curved near their upper ends to engage the blade, one of said jaws having an aperture to receive one of said grinding-wheels; and a pair of pivoted jaws mounted close to the aforesaid jaws and adapted to engage the back of the blade being ground; the said blade-holding device being mounted between the said adjustable supports, substantially as described.

5. In a sharpening-machine, the combination of a base; supports adjustably secured to said base; grinding-wheels carried by said adjustable supports; a supporting-plate mounted between said adjustable supports; a pair of upright jaws, one of said jaws being provided with an aperture to receive one of said grinding-wheels; rods journaled in the lower ends of said jaws and in the ends of said supporting-plate; lugs carried by the lower ends of said jaws and adapted to engage each other and to hold the upper ends of said jaws together; a second pair of jaws mounted close to the first pair; rods journaled in the lower ends of said jaws and in the ends of said plate; lugs carried by the lower ends of said jaws, adapted to engage each other and to hold the upper ends of the said jaws together, substantially as described.

6. In a sharpening-machine of the character described the combination with a base; of upwardly-extending arms pivoted thereto; means for securing said arms in different angular positions; uprights carried by said arms and integral therewith; shafts journaled in said uprights; grinding-wheels mounted on said shafts; pulleys mounted on said shafts; means for transmitting motion to the shafts carrying the pulleys and grinding-wheels; and a blade-holding device adapted to hold the blade to be ground between the said grinding-wheels, substantially as described.

7. In a sharpening-machine, the combination with a base of arms adjustably secured thereto; uprights carried by said arms; shafts journaled in said uprights, grinding-wheels mounted on said shafts; pulleys mounted on said shafts; means for transmitting motion to the pulleys; and a blade-holding device consisting of upright pivoted jaws for holding the blade between the said grinding-wheels, substantially as described.

8. In a sharpening-machine, the combination with a base of upwardly-extending arms crossed near their lower ends and pivotally secured to said base; uprights carried by said arms and made integral therewith, slots in said uprights, adjusting-screws adapted to pass through said slots and secure said uprights to said base, shafts journaled in said uprights, grinding-wheels mounted fast on said shafts, pulleys mounted fast on said shafts and means for imparting motion to said pulleys; of a plate integral with said base, supporting a blade-holding device, consisting of a pair of upright pivoted jaws, adapted to engage the blade and hold the same in a vertical position, one of said jaws being composed of two members separated at their upper ends to admit of the passage of one of said grinding-wheels and the other jaw being composed of a single member mounted to one side of the grinding-wheels; lugs carried by the lower ends of said jaws, adapted to engage each other and impart similar movements to the opposite jaw; a spring connected to said jaws to hold their upper ends together; rods journaled in the lower ends of said jaws and rods journaled in the end of said supporting-plate; a second pair of pivoted jaws mounted near said first jaws, and each jaw composed of two upright members joined at their tops and adapted to hold the back of the blade being ground; lugs carried by the lower ends of said second pair of jaws and adapted to engage each other and impart similar movements to the opposite jaw; a spring connecting said second jaws having a tendency to hold their upper ends together; rods journaled in the lower ends of said jaws and rods journaled in the end of said supporting-plate, substantially as described.

In testimony whereof I sign this specification in the presence of two witnesses.

MARY L. WORDEN,
*Administratrix of the estate of Charles A. Worden, deceased.*

Witnesses:
D. EDGAR WILSON,
PERCY WILSON.